Aug. 16, 1960
R. HELL
2,949,501
APPARATUS FOR PRODUCING PUNCHED CODING TAPES OF VERY LONG PERIOD
Filed Oct. 28, 1955
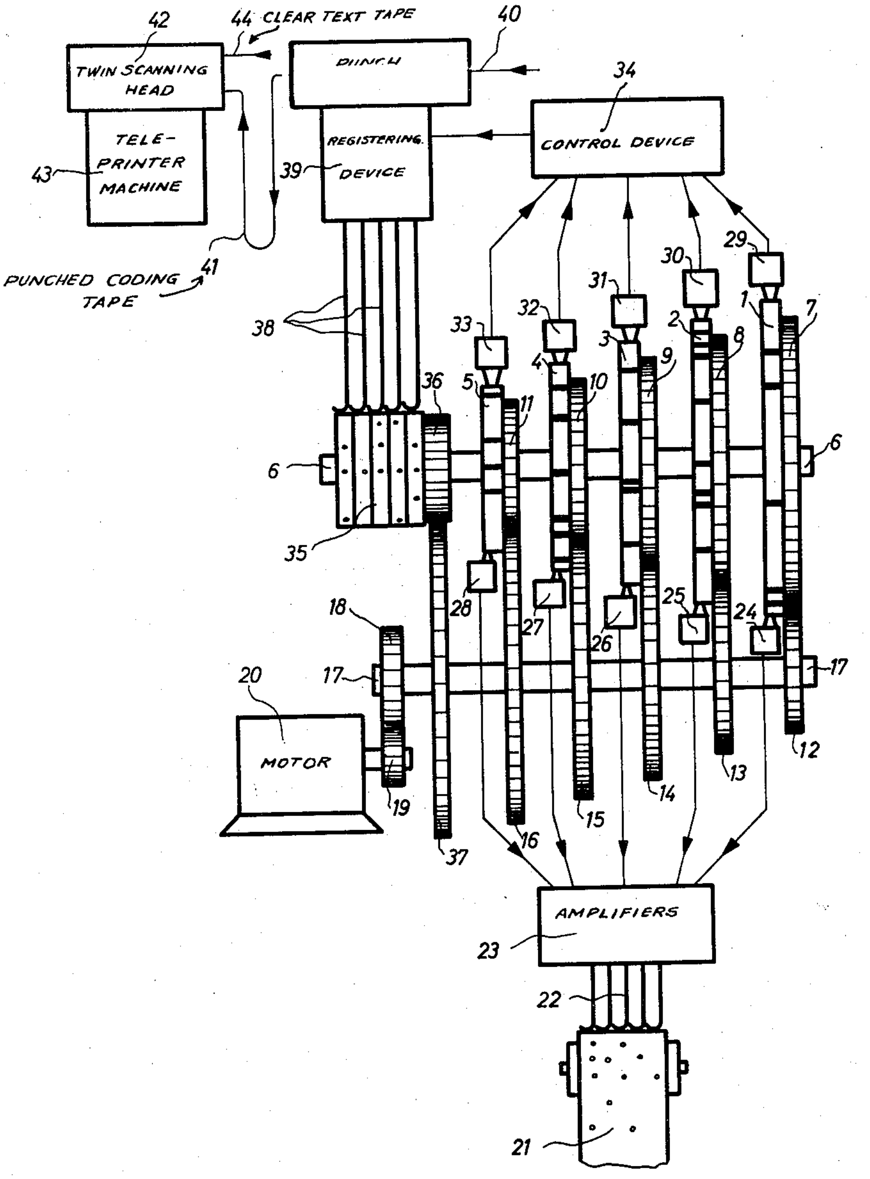
Inventor:
Rudolf Hell
By [signature] Atty.

United States Patent Office 2,949,501
Patented Aug. 16, 1960

2,949,501

APPARATUS FOR PRODUCING PUNCHED CODING TAPES OF VERY LONG PERIOD

Rudolf Hell, Kiel-Dietrichsdorf, Germany, assignor to Kommanditgesellschaft Dr. Ing. Rudolf Hell, Kiel-Dietrichsdorf, Germany, a German firm Filed Oct. 28, 1955, Ser. No. 543,549

Claims priority, application Germany Jan. 26, 1955

14 Claims. (Cl. 178—22)

This invention is concerned with apparatus for producing in binary teleprinter code extended punched coding tapes of very long period, for use in coding machines.

Coding methods are known wherein binary symbol elements of an aperiodic coding tape produced individually following no law and with senseless and arbitrary distribution of the code groups, are multiplicatively superimposed upon the binary symbol elements of clear-text tapes carrying the message to be coded, for example, in the form of punched 5-element or 7-element groups. The individual 5-element groups of both tapes are simultaneously scanned along mutually corresponding places and the signs of corresponding punched symbol elements (for example, hole=plus; no hole=minus) are electrically multiplied according to the algebraic sign rules, such that $$+\cdot+=+;\ -\cdot-=+;\ +\cdot-=-;\ -\cdot+=-.$$

This method has the proven advantage of absolute dependability from the standpoint of coding technique, but has the organizational and technical disadvantage that the aperiodic coding tape must be as long as the clear-text tape and can be used only once.

The object of the invention is to obtain from a given aperiodic coding tape of a length which is short as compared with the length of the clear-text tape, a periodic coding tape with very long period which makes it possible to code a great number of messages without having to produce a separate aperiodic coding tape for each new message. A new aperiodic coding tape need be prepared only after longer intervals, namely, only when the periods of cycles of the coding tape are exhausted.

Some of the important terms which will be used herein will now be defined to facilitate understanding.

The Symbol Element can be represented by + and — or 1 and 0 or hole and no hole. In operation with punched tape, binary symbol elements are represented by hole and no hole (absence of hole).

The Symbol Element Sequence consists of successive symbol elements regardless of using, for example, the 5-element or the 7-element teleprinter code. In the case of punched tape operation, the symbol element sequence is a sequence of hole and no hole parallel to the longitudinal extent of the punched tape, the 5-element code tape thereby having five symbol element sequences.

The Symbol Element Combination consists of a combination of 3, 5 or 7 (dependent upon the code used) symbol elements. For example, in the case of a punched tape for the 5-element code, a symbol element combination is a combination of 5 elements (hole and no hole) perpendicular to the longitudinal extent of the tape.

The Sequence of Symbol Element Combinations consists of a succession of symbol element combinations extending one after the other in longitudinal direction of the punched tape. For example, any punched tape for the 5-element or the 7-element teleprinter code can be designated as a sequence of symbol element combinations.

The coding tape is said to be periodic when it carries transversely extending sequences of binary symbol element combinations (for example, punched 5-element groups), which are periodically repeated. The number of the symbol element combinations in such sequence is referred to as the period of the coding tape.

The object of the invention, to produce extended coding tapes of very long period, in a binary teleprinter code, for use in coding machines, is achieved by employing a relatively short, non-periodic, arbitrarily selected sequence of symbol element combinations, whereby the $n$ symbol element sequences formed respectively of 1., 2., 3., to $n$th symbol element (for example, + and — or 1 and 0 or hole and no hole) exhibit symbol element numbers no two of which have a common divisor, the symbol elements of the symbol element sequence being stored in storage elements of corresponding storage element sequence, each storage element sequence having a number of storage elements corresponding to the number of symbol elements contained in the respective symbol element sequence, the storage elements of these sequences being read periodically and with identical speed, starting from a desired selectible relative starting position of the sequences one relative to the other, the read symbol element combinations being continuously compared with a predetermined symbol element combination for the purpose of ascertaining occurrence of agreement between one of the read symbol element combinations with said predetermined symbol element combination, and effecting selecting and registering, from a further periodical arbitrarily selected sequence of all $2^n$ possible symbol element sequences, which is aliquant to the other sequences and offered at the same speed, those of the symbol element combinations which are received at instants of ascertaining said agreement, the sequence of the selected and registered symbol element combinations being employed to produce the extended punched coding tape.

According to the invention, the storing means or storers are made in the form of rotating discs carrying ferromagnetic layers peripherally thereof for magnetically storing the symbol elements of the individual symbol element sequences of the aperiodic coding tape. The storing discs rotate with different speeds, acting in the manner of numbers with no common divisor; however, when one disc rotates by a symbol element step, all remaining discs will likewise rotate by one symbol element step.

According to a further feature of the invention, there is provided an auxiliary rotating disc carrying peripherally thereof one next to the other a number of symbol element sequences which is equal to the number of symbol element sequences of the aperiodic coding tape, such sequences containing the same number of symbols; the auxiliary disc rotating together with the remaining storing discs, and the number of symbol elements upon one sequence of such auxiliary disc having no common divisor with the numbers of symbol elements stored upon the storing discs, the auxiliary disc executing a symbol element step together with the stepping of the remaining discs.

The period of the storing system is equal to the product of the periods (symbol element capacity) of the individual storing discs and becomes a maximum when the symbol element capacity (number of symbol element steps) are close to one another and have no common divisor. The occurrence of the predetermined (agreed upon) and adjusted or preset symbol element combination in the system of pickup or reading devices becomes lawful but irregular and aperiodic within the period of the storing system. The pickup selects from the period of the recording system individual steps which are used for the coding. The period of these steps is smaller than the period of the storing system but is very difficult to reconstruct mathematically.

The following devices serve for the coding: (1) The aperiodic coding tape taken into use; (2) the relative initial or start positions of the storing discs; (3) the setting of the pickup or reading devices with respect to the agreed-upon symbol element combination; (4) the symbol element combination sequence of the auxiliary storing means; and (5) the nature of the superimposing (allotting) of the symbol elements of the coding tape with respect to the clear-text tape.

The various objects and features of the invention will appear from the following description of an embodiment shown in the accompanying drawing.

The five coaxially disposed storage discs 1, 2, 3, 4, 5 which are peripherally provided with ferromagnetic coatings, are arranged, for rotation, on the shaft 6. The five storage discs are each respectively disengageably connected with gears 7, 8, 9, 10, 11 which are respectively in mesh with the gears 12, 13, 14, 15, 16. The latter are firmly keyed onto the shaft 17, which is driven by means of a reduction gear 18, 19 controlled by the motor 20. The storage discs have different peripheral closely adjacent divisions, the number of divisions being in the relationship of aliquant numbers to each other (having no common divisor). The gear reductions are so selected that when one disc advances a given number of steps of its peripheral division, all the other discs move similarly. The gear ratios are accordingly reciprocal with respect to the symbol element capacity.

Numeral 21 indicates a section of the aperiodic coding tape on which the series of symbol elements are recorded arbitrarily, for instance, in the form of a punched 5-element code. The number of symbol elements of the individual symbol element sequences are equal to the element number capacities of the storage discs. Numeral 22 indicates a scanning device, for instance in the form of five wipers or brush springs, which scans the punched symbol elements, the scanning producing pulses which are amplified at 23 and converted into direct-current or alternating-current pulses. These pulses are fed to five magnetic recording heads 24, 25, 26, 27, 28 which magnetize the peripheries of the five rotating storage discs with direct or alternating current in accordance with symbol elements picked-up. Instead of converting only one of the two binary symbol elements into an alternating current impulse, both symbol elements may be converted into alternating current impulses of different frequencies. The paper feed of 21 is in suitable manner (not shown) driven by the motor 20. The periphery of the storage disc having the largest symbol element capacity is divided into a number of parts equal to the number of symbol elements contained in one sequence of symbol elements of the coding tape. The other discs have a smaller number of divisions respectively equal to the number of the other symbol sequences.

The recording heads 24–28 need not lie on a line transverse to the storage discs but may be arranged at an angle to each other.

All storage discs may be brought into a predetermined initial position by an uncoupling device (not shown) provided for this purpose. Each storage disc has for this purpose a number of stop positions corresponding to the number of its symbol element capacity.

Numerals 29, 30, 31, 32, 33 indicate five magnetic pick-up or reading heads which serve to pick up the stored symbol elements. These heads may also be arranged at an angle to each other.

The outputs of the five pick-up heads are fed to a control device 34 which responds operatively only when a predetermined agreed upon and adjusted symbol element combination is scanned by the pick-up heads. If, for instance, the combination of symbol elements +++++ is agreed upon and if the pick-up heads are serially connected, observing the correct polarity, an electronic pick-up or reading may be effected by applying the total voltage of the magnetic heads to the grid of an electron tube which is negatively biased so that it cuts off if not more than four positive pulses occur, while becoming conductive if five positive pulses are picked up simultaneously. In this way whenever the agreed upon symbol element combination is picked up, a pulse is given off in the plate circuit of the tube.

A sixth auxiliary disc 35 is rotatably arranged on the shaft 6, which is connected with the gear 36, such gear being driven by the gear 37 on the shaft 17. On the periphery of this disc, the 5-element code, that is, a maximum of 32 different symbol combinations, is applied in the form of arbitrary sequences of perforations or magnetically or optically stored in any arbitrary sequence. The number of subdivisions of disc 35, for instance 32, is in aliquant relationship to the number of divisions of the other discs. The transmisison ratio of gears 36, 37 is again so selected that the disc 35 upon rotating advances by one division or symbol element step when the other discs move one division. In order to be able to change the sequence of the 32 combinations of symbol elements on disc 35, it is advisable to divide the disc 35 into five individual discs which can be turned and fastened with respect to each other, and on the peripheries of which the signs hole, no hole, magnetized or nonmagnetized or blackened and non-blackened are contained in any arbitrary sequence.

Numeral 38 is a scanning device, which, if the symbol elements are contained on the disc in the form of holes, comprises five scanning wipers, and if the elements are magnetized onto the disc, comprises five magnetic scanning heads. If the symbol elements are recorded in the form of black and white areas, the scanning device will comprise five illuminating sources and five photocells which ascertain the reflected light intensity. Numeral 39 is a recording or registering device, for instance a punch, which is continuously prepared by the continuous scanning of the symbol element combinations on disc 35 and punches the corresponding combination of perforations in a paper tape 40 only when a pulse given off by the control device 34 is fed to the punch. The paper tape is advanced by one perforation space after each punching.

The punched coding tape 41 is fed to the twin scanning head 42 of a teleprinter 43 into which there is simultaneously introduced the clear text tape 44 of the message to be coded in punched 5-element code. In 42, the elements of the punched coding tape 41 are in known manner multiplicatively superimposed on the clear text tape 44 in accordance with the symbol element combination of perforations (for instance perforation or hole = +, no hole = —). The coded message is then transmitted in the form of trains of current pulses to the transmission line and may be decoded with the same apparatus by analogous procedure.

Since the coding tape 41 leaves the registering device 39 in very irregular intervals and with a very great difference in speed, while the teleprinter 43 operates with respect to the tape 41 with constant speed, the coding tape 41 is fed to the machine 43 in a sufficiently long loop which serves as equalizer to compensate for the difference between the two speeds.

The speed of rotation of the system of storage discs can be controlled by the size of the loop so as to avoid extension of an excessively small or excessively large amount of tape within the range of the loop 41.

Changes may be made within the scope and spirit of the appended claims which define what is believed to be new and desired to have protected by Letters Patent:

I claim:

1. Apparatus for producing in binary teleprinter code extended punched coding tapes of very long period, for use in a coding machine, utilizing relatively short, non-periodic, arbitrarily selected sequences of symbol element combinations, whereby the symbol element sequences formed of the respective symbol elements exhibit symbol element numbers no two of which have a common divisor, comprising storage means for successively storing the symbol elements of the respective symbol element sequences at a predetermined speed, each storage means having a number of storage elements corresponding to the number of symbol elements contained in the respective symbol element sequences, means for periodically reading with identical speed the respective stored symbol element sequences starting from a desired selectible relative starting position of the respective sequences one relative to the other, means for continuously comparing the successive read symbol element combinations formed by said symbol element sequences with a predetermined symbol element combination to ascertain occurrence of agreement between one of said read combinations and said predetermined combination, auxiliary means containing a further periodic arbitrarily selected sequence of all possible symbol element sequences which is aliquant to the other sequences, an operating device for receiving with identical speed the successively read and compared symbol element combinations and the symbol element combinations from said auxiliary means, said operating device being effective to select and to register from said symbol element sequences supplied by said auxiliary means those symbol element combinations which are respectively received at instants of ascertaining said agreement and being further effective to utilize said selected and registered symbol element combinations for producing the extended punched coding tape.

2. Apparatus according to claim 1, wherein the binary symbol elements of the short, non-periodic and arbitrarily selected sequence of symbol element combinations are represented in a tape by hole and no hole.

3. Apparatus according to claim 1, wherein the short, non-periodic and arbitrarily selected sequence of symbol element combinations are provided upon a tape in teleprinter code having a desired number of elements.

4. Apparatus according to claim 3, comprising means for converting, prior to the storing of said relatively short, non-periodic and arbitrarily selected sequence of symbol element combinations, one type of the binary symbol elements into corresponding direct current impulses.

5. Apparatus according to claim 3, comprising means for converting, prior to the storing of said relatively short, non-periodic and arbitrarily selected sequence of symbol element combinations, one type of binary symbol elements into alternating current pulses.

6. Apparatus according to claim 3, comprising means for converting, prior to the storing of said relatively short, non-periodic and arbitrarily selected sequence of symbol element combinations, both types of binary symbol elements into alternating current pulses of different frequencies.

7. Apparatus according to claim 3, comprising a device for scanning the short, non-periodic and arbitrarily selected sequence of symbol element combinations to effect the storing thereof, a reading device for each storage element sequence, each reading device being adjustable and responsive to one of the binary symbol elements, switching means for effecting, upon ascertaining agreement of one of the read symbol element combinations with said predetermined symbol element combination, the selection of those symbol element combinations which are present at the instant of agreement, and means for punching the selected symbol element combinations as hole combinations into the tape which is to represent the extended coding tape.

8. Apparatus according to claim 7, comprising rotatable discs constituting said storage elements, each disc being peripherally provided with a ferromagnetic layer for magnetically storing the corresponding symbol element sequence, and means for rotating said storage discs with different speeds which while operating in the manner of aliquant numbers are effected so that when one disc executes a symbol element step, all other discs likewise execute a symbol element step.

9. Apparatus according to claim 8, comprising magnetic recording heads disposed respectively relatively to said discs for storing the symbol element sequences upon the ferro magnetic layers of the respective discs.

10. Apparatus according to claim 8, comprising a magnetic reading head for each storage disc for reading the symbol element sequence magnetically stored thereon.

11. Apparatus according to claim 10, comprising switching means for effecting, incident to the reading of the storage discs, operative actuation of a control member only upon appearance of a symbol element combination which had been set in said reading heads.

12. Apparatus according to claim 8, wherein said auxiliary means comprises an auxiliary rotatable storage disc upon the periphery of which are side by side provided symbol element sequences corresponding in number to the number of symbol element sequences of the short, non-periodic and arbitrarily selected symbol element sequences, whereby the number of symbol elements of each symbol element sequence upon said auxiliary disc is aliquant to the numbers of symbol elements of the symbol element sequences stored on the storage elements, and means for causing the auxiliary disc to execute a symbol element step coincident with the execution of a symbol element step of the storage discs.

13. Apparatus according to claim 12, comprising switching means for effecting, incident to the reading of the storage discs, operative actuation of a control member only upon appearance of a symbol element combination which had been set in said reading heads, a registering device which is, upon operation of the control member, effective to select from the symbol element sequences of the auxiliary storage disc the symbol element sequence just received and to punch such sequence into a paper tape.

14. Apparatus according to claim 13, in combination with a teleprinter machine having a twin scanning head, comprising means for causing the extended punched coding tape leaving said registering device to form a loop of sufficient size before it is extended to said twin scanning head, the clear text punched tape which is to be superimposed upon the coding punched tape leaving such twin head with constant speed.

References Cited in the file of this patent

UNITED STATES PATENTS

| | | |
|---|---|---|
| 2,794,851 | Morris | June 4, 1957 |
| 2,797,260 | Roschke | June 25, 1957 |